Figures 1, 2:
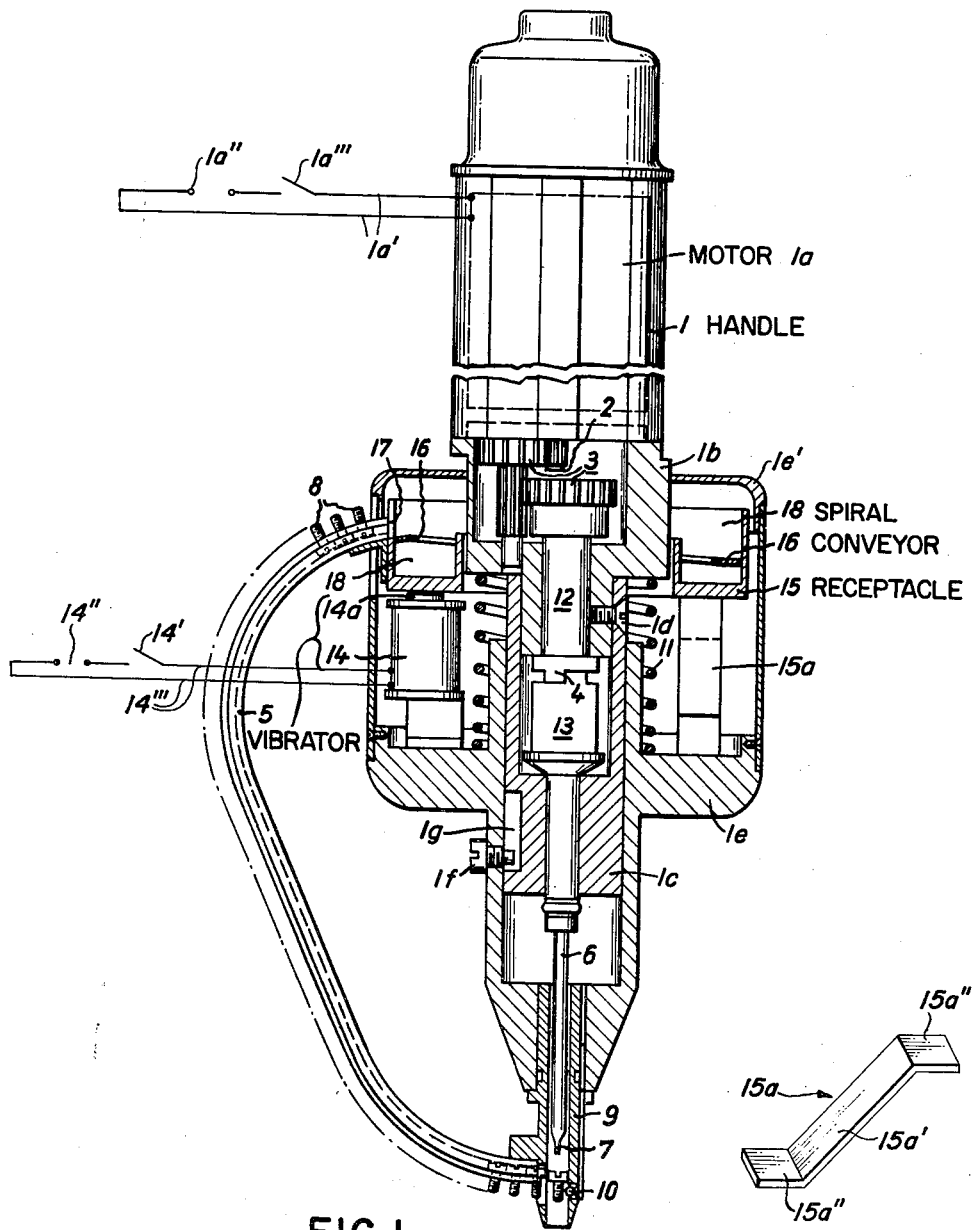

United States Patent Office 3,021,882
Patented Feb. 20, 1962

3,021,882
SCREW FEED AND DELIVERY MEANS FOR A POWER-OPERATED SCREW DRIVER
Joseph Knoll, Berlin-Buckow, Erwin Bestel, Berlin-Schoneberg, and Heinz Stolp, Berlin, Germany, assignors to Allgemeine Elektricitäts-Gesellschaft, Berlin-Grunewald, Germany
Filed Nov. 27, 1959, Ser. No. 855,582
Claims priority, application Germany Dec. 2, 1958
6 Claims. (Cl. 144—32)

The present invention relates to a screw feed and delivery means for a power-operated screw driver.

The introduction of electrically operated screw drivers has considerably simplified and speeded up the driving of screws. The work output or capacity of such screw drivers has been further increased by an arrangement which automatically feeds properly positioned screws to the screw driver, so that individual screw driving operations can be carried out in more rapid succession. Heretofore known screw drivers use a loadable magazine or a screw feed which operates by compressed air. Both systems have their disadvantages; in the case of the magazine-fed screw driver, the tool will be useless if no fresh magazines are available when needed, and in the case of the screw driver wherein the screw feed is operated by compressed air, the tool is too heavy and too unwieldy to allow easy handling, thereby making it difficult to move the tool to the work pieces where the screw driving operation is to take place.

It is, therefore, an object of the present invention to provide a screw feed which overcomes the above disadvantages, and this is achieved by a particularly advantageous arrangement which makes the screw driver according to the present invention easy to handle and to operate. The screw driver is especially well suited for use where small screws are used, for instance, screws having a shank which is shorter than the diameter of the head of the screws. Existing electrically operated screw drivers equipped with a feed mechanism are not suited for handling such screws.

More particularly, the present invention resides in an electrically operated screw driver having a screw driver blade formed at its end with a bit and a motor for turning the blade, the blade and motor being arranged along the axis of the screw driver, which screw driver further comprises a receptacle arranged about the axis and able to receive an indeterminate number of similar screws, a spiral conveyor arranged in the receptacle, vibrating means for vibrating the receptacle and conveyor therein for aligning screws received in the receptacle, and feed channel means for receiving aligned screws from the receptacle and feeding them to the bit of the screw driver blade in a position in which the bit will be able to engage the screws for turning the same.

Additional objects and advantages of the present invention will become apparent upon consideration of the following description when taken in conjunction with the accompanying drawing, in which the FIGURE 1 is a sectional view of a screw driver according to the present invention and FIGURE 2 is a perspective view of a detail.

Referring now to the drawing, the same shows a screw driver having a handle 1 within which a conventional motor 1a is arranged. As is customary in tools of this type, the motor is switched on only during the actual screw driving operation, the motor leads being shown schematically at 1a' and the power supply and switch at 1a" and 1a''', respectively. When the tool is not in use, it should be hung vertically. The motor has a shaft 2 the lower end of which is connected to a reduction gear 3. The output of the reduction gear is transmitted to a shaft 12 the lower end of which is connected to the upper end of a second shaft 13 by means of a force transmitting clutch 4. The shaft 13 forms the socket for the screw driver blade 6 whose lower end is formed as a conventional screw driver bit 7.

It will be seen from the drawing that the shaft 12 is arranged within a member 1b which itself is fastened to the handle 1, and that the shaft 13 is arranged within a second member 1c, these two members being connected together by a screw 1d. The member 1c is slidably received within a casing 1e, so that the parts 1, 1b, 1c together constitute a movable entity which is slidable with respect to the casing 1e, the limit of movement being determined by a set screw 1f and a slot 1g formed in the member 1c. The casing 1e carries its upper end and a removable cover 1e and at its lower end a barrel 9 within which the screw driver blade 6 may move up and down.

A spring 11 is interposed between the casing 1e and a shoulder of the member 1b, thereby urging the parts into the position illustrated in the drawing. When it is desired to drive a screw, the handle is moved downwardly with respect to the casing 1e, thereby compressing the spring 11, until the bit 7 engages a screw within the barrel 9. The manner in which the screw is introduced into the barrel will be described below.

The screw driver according to the present invention further comprises a ring-shaped receptacle 15 which is arranged about the axis of the screw driver and is concentric with the handle 1. The receptacle is mounted within the casing 1e by means of suitable springs 15a and has arranged within it an ascending spiral conveyor 16 which starts at the bottom and terminates at an exit 17. Only one spring 15a is shown in FIGURE 1; FIGURE 2 shows such spring as having an elongated central portion 15a' and two bent end portions 15a", by which end portions the spring is attached to the casing 1e and the receptacle 15. The casing 1e also contains a suitable number as, for example, three magnetic coils 14 each having an armature 14a. Only one coil and armature set is shown in the drawing. The coils are connectable by a switch 14' to a source 14" of alternating current of a certain frequency via leads shown schematically at 14''', and will thus serve as vibrating means for vibrating the spring-mounted receptacle 15. Each coil is carried by a support 14b which is suitably fastened to the casing 1e.

The receptacle may be filled at random with an indeterminate number of screws which, under the influence of the vibrations to which the receptacle 15 is subjected, will be caused to move up the conveyor 16 toward the exit 17 which separates the interior 18 of the receptacle from a feed channel 5. Because the center of gravity of small screws is located within the screw head, the screws will, during their travel along the conveyor 16, be placed upon their heads, and they will reach the exit 17 in this position. Accordingly, the exit 17, which is also constitutes the entrance to the feed channel 5, is shaped to match the profile of the screws standing on their heads, so that any screws not in this position will be prevented from passing through the exit 17 and drop back into the receptacle, from where they will again start their journay along the conveyor 16. In this manner, the feed channel is filled and continuously refilled with screws, as shown at 8.

As shown in the drawing, the feed channel runs from the conveyor 16 to the barrel 9 and terminates at a point somewhat below that which is occupied by the screw driver bit 7 when the parts are held by the spring 11 in the position shown in the drawing. The feed channel 5 is curved to allow the screws assembled therein to slide down easily, this downward sliding motion being assisted by the vibrations of the above-described vibrating means 14, 14a. The operation of these vibrating means is not dependent on whether the motor is switched on or off. It has been found expedient to keep the vibrating means going continuously even when the screw driver motor is switched off, so that the feed channel may be continuously refilled irrespective of the operation of the motor.

The weight of the screws in the feed channel 5 will always cause a screw to drop into the barrel 9 within which the screw driver blade runs up and down. The inside diameter of the barrel is as large as the diameter of the screw heads. As soon as the screw driver blade has pushed out, gripped, and screwed in the screw located within the barrel, and is then returned to the position shown in the drawing under the action of the spring 11, the barrel is empty so that the next screw can slide in place. In this way, an uninterrupted series of screw driving operations can be carried out one after the other.

A suitable spring detent ball 10 is provided within the barrel 9, which will prevent the next screw coming into the barrel 9 from falling out. It is evident that this ball will yield to allow the screw driver blade bit 7 to engage the fresh screw and to move it out of the barrel. It will also be appreciated that while the blade 6 is in the process of screwing in a screw, the blade itself will block the entry of screws from the feed channel into the barrel.

The working position of the screw driver may be shifted by as much as 90°. In such position, of course, the vibratory receptacle 15 will be ineffective and the steady supply of screws will be interrupted. However, inasmuch as the screw driver will be returned to its normal position at least after several screwing operations, the receptacle 15 will again become operative and the feed channel will be refilled so that the screw driver will continue to be ready for further work.

What we claim is:

1. In an electrically operated screw driver having a screw driver blade formed at its end with a bit and a motor for turning said blade, said blade and motor being arranged along the axis of the screw driver, a screw feed and delivery means which comprises: a receptacle arranged about said axis, said receptacle being able to receive an indeterminate number of similar screws; a spiral conveyor arranged in said receptacle; vibrating means for vibrating said receptacle and conveyor therein for aligning screws received in said receptacle, and feed channel means for receiving aligned screws from said receptacle and feeding them to said bit of said screw driver blade in a position in which said bit will be able to engage said screws for turning the same.

2. The combination defined in claim 1 wherein said vibrating means are operated independently of said motor, whereby said feed channel may be continuously refilled irrespective of the operation of said motor.

3. The combination defined in claim 1 wherein said screws, under the influence of said vibrating means, are brought into an aligned position determined by their centers of gravity and wherein said feed channel means has an entrance of a profile corresponding to that of the screws in their aligned positions.

4. The combination defined in claim 1 wherein said screw driver further comprises a barrel within which said screw driver blade is arranged and wherein said feed channel means terminates at said barrel.

5. The combination defined in claim 4 wherein said screw driver further comprises spring detent means for retaining a screw in said barrel after it has moved thereinto, said spring detent means being yieldable to allow said screw driver blade to engage the screw and to move it out of said barrel.

6. The combination defined in claim 4 wherein said screw driver blade blocks the entry of screws from said feed channel means into said barrel when said screw driver blade is in operative position in which a previous screw has been moved out of said barrel, there being spring means for continuously urging said screw driver blade back into said barrel into a normal position wherein a fresh screw may enter said barrel.

References Cited in the file of this patent
UNITED STATES PATENTS

| | | |
|---|---|---|
| 2,272,279 | Schindel | Feb. 10, 1942 |
| 2,754,860 | Moore et al. | July 17, 1956 |
| 2,770,269 | Austin | Nov. 13, 1956 |
| 2,845,968 | Luber | Aug. 5, 1958 |
| 2,922,447 | Moore | Jan. 26, 1960 |
| 2,927,491 | Bochman | Mar. 8, 1960 |